(12) United States Patent
Zhao et al.

(10) Patent No.: US 11,534,739 B2
(45) Date of Patent: Dec. 27, 2022

(54) LIGNITE CHAR SUPPORTED NANO-COBALT COMPOSITE CATALYST AND PREPARATION METHOD THEREOF

(71) Applicant: Wuhan University of Technology, Wuhan (CN)

(72) Inventors: Chunxia Zhao, Wuhan (CN); Feng Li, Wuhan (CN); Wen Chen, Wuhan (CN); Wei Jin, Wuhan (CN); Yanyuan Qi, Wuhan (CN); Shuang Yang, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 17/101,680

(22) Filed: Nov. 23, 2020

(65) Prior Publication Data

US 2021/0346872 A1  Nov. 11, 2021

(30) Foreign Application Priority Data

May 7, 2020 (CN) .......................... 202010375770.X

(51) Int. Cl.
| | |
|---|---|
| *B01J 23/75* | (2006.01) |
| *B01J 21/18* | (2006.01) |
| *B01J 35/00* | (2006.01) |
| *B01J 35/10* | (2006.01) |
| *B01J 37/00* | (2006.01) |

(Continued)

(52) U.S. Cl.
CPC .............. *B01J 23/75* (2013.01); *B01J 21/18* (2013.01); *B01J 35/0013* (2013.01); *B01J 35/1019* (2013.01); *B01J 37/0036* (2013.01); *B01J 37/0203* (2013.01); *B01J 37/0207* (2013.01); *B01J 37/0236* (2013.01); *B01J 37/088* (2013.01)

(58) Field of Classification Search
None
See application file for complete search history.

(56) References Cited

PUBLICATIONS

Yang et al., Acid washed lignite char supported bimetallic Ni—Co catalyst for low temperature catalytic reforming of corncob derived volatiles, Energy Conversion and Management, 2019, 196, 1257-1266 (Year: 2019).*

(Continued)

*Primary Examiner* — Coris Fung
*Assistant Examiner* — Keling Zhang
(74) *Attorney, Agent, or Firm* — M&B IP Analysts, LLC

(57) ABSTRACT

The present disclosure provides a lignite char supported nano-cobalt composite catalyst and a preparation method thereof. In the method, lignite is used as a raw material, and a lignite char supported high dispersion nano-cobalt composite catalyst is obtained by a modified impregnation method followed by a high temperature pyrolysis process. The composite catalyst prepared by the present disclosure has a hierarchical pore structure, a high specific surface area, and uniformly dispersing nano-sized cobalts on the lignite char with controllable particle size, so that the obtained catalyst has an excellent catalytic activity for low-temperature $CO_2$ methanation; moreover, the preparation process is simple and feasible, the raw materials used are cheap and easily available. Therefore, the composite catalyst is very suitable for industrial production and application.

9 Claims, 3 Drawing Sheets

(51) Int. Cl.
    *B01J 37/02*    (2006.01)
    *B01J 37/08*    (2006.01)

(56) References Cited

PUBLICATIONS

Wang et al., Fuel Processing Technology, 2015, 136, 17-24 (Year: 2015).*

Blanco et al., Effect of the synthesis method on Co-catalysts based on MCM-41 for the Fischer-Tropsch reaction, Top Catal., 2011, 54, 190-200 (Year: 2011).*

Shechter, 3 benefits of ultrasonic mixers, https://www.beei.com/blog/3-benefits-of-ultrasonic-mixers, 2019 (Year: 2019).*

* cited by examiner

LIGNITE CHAR SUPPORTED NANO-COBALT COMPOSITE CATALYST AND PREPARATION METHOD THEREOF

CROSS REFERENCE TO RELATED APPLICATION

This application claims the priority of Chinese Patent Application No. 202010375770.X, entitled "Lignite char supported nano-cobalt composite catalyst and preparation method thereof" filed with the China National Intellectual Property Administration on May 7, 2020, which is incorporated herein by reference in its entirety.

TECHNICAL FIELD

The present disclosure relates to the technical field of $CO_2$ methanation catalyst, and in particular to a lignite char supported nano-cobalt composite catalyst and a preparation method thereof.

BACKGROUND

The greenhouse effect caused by excessive $CO_2$ emission is one of the urgent environmental problems to be solved. Efforts have been made to comprehensively treat and utilize $CO_2$ by capturing, storing, and converting $CO_2$ into other valuable substances. $CO_2$ is a carbon source, which can be converted into various useful chemical raw materials and fuels (including $CH_4$, CO, $CH_3OH$, HCOOH, etc.) by $CO_2$ hydrogenation. Hydrogenation of $CO_2$ to methane ($CH_4$) is one of the most promising $CO_2$ conversion technologies, because its product methane can be directly added to natural gas network as a fuel, and can also be used as a raw material for producing other chemical products. Hydrogenation of $CO_2$ to methane is also called $CO_2$ methanation reaction. The reaction is feasible in thermodynamics, but it is very slow due to the limitation of kinetics. Therefore, in order to realize industrial production, it is necessary to provide a certain reaction temperature and a catalyst.

At present, the commonly used $CO_2$ methanation catalysts are oxide (such as $Al_2O_3$, $SiO_2$, etc.) supported catalysts. Among them, the catalysts loaded with noble metals Ru and Rh have excellent catalytic activity for $CO_2$ methanation. For example, $Ru/TiO_2$ shows catalytic activity and a $CH_4$ selectivity of 100% at near room temperature (*Catalysis Letters*, 1991, 11(2): 157). However, this kind of catalyst is expensive, limiting its widespread industrial application. Therefore, people turned to study transition metals that are relatively cheap (including Ni, Co, etc.). Compared with noble metals, oxide supported Ni or Co catalysts need higher reaction temperature (over 350° C.) and pressure to achieve considerable $CO_2$ conversion and $CH_4$ selectivity (*Catalysis Today*, 2013, 215: 201). But it often leads to carbon deposition on the catalysts, active metal sintering, metal support reaction and so on, resulting in catalyst deactivation. For example, Srisawad et al. found that Co can react with $Al_2O_3$ to form $CoAl_2O_4$ spinel at a high temperature, which leads to catalyst deactivation (*Reaction Kinetics, Mechanisms and Catalysis*, 2012, 107 (1): 179). On the other hand, the reaction conditions of high temperature and high pressure consume enormous energy, which deviates from the original intention of energy saving and emission reduction. Therefore, low-temperature $CO_2$ methanation catalysts have become a research trend. Weatherbee et al. considered that Co has a better catalytic activity for $CO_2$ methanation than Ni (*Journal of catalysis*, 1984, 87 (2): 352). However, compared with Ni-based catalysts, there are fewer researches on cobalt-based catalysts, especially on the catalytic activity of $CO_2$ methanation at a low temperature and atmospheric pressure.

In addition, studies have shown that oxide supports can react with active metals to produce compounds that are difficult to be reduced, which affects the catalytic activity. Therefore, carbon materials have attracted researchers' attention as alternative supports. For example, Bai et al. found that compared with $Co/SiO_2$, Co/CNT has a shorter activation time and a lower activation temperature, and can avoid reacting with oxide support to form $CoSiO_4$ (*Catalysis Communications*, 2012, 22: 24). Nitrogen-doped carbon nanofibers and reduced graphene oxide (rGO) have also been used as catalyst supports. For example, Roldan et al. prepared a Ru/NCNF composite catalyst with nitrogen-doped carbon nanofibers as the support, which shows competitive $CH_4$ production rate and stability compared to $Al_2O_3$-supported catalysts ($Ru/Al_2O_3$) (*ChemSusChem*, 2017, 10(6): 1139). However, this new type of carbon nano-material has a relatively high preparation cost.

In contrast, lignite is a very cheap natural carbon material with abundant reserves and rich pore structures, which is expected to be used to prepare cheap industrial catalysts. Jingpei Cao et al. prepared a Ni/C catalyst with lignite as a carbon precursor by an ion exchange method and applied it to a biomass volatilization reforming (*Fuel*, 2017, 202: 345); furthermore, they prepared a Ni—Co/AWSL catalyst and applied it to catalyzing the conversion of corncob volatiles (*Energy Conversion and Management*, 2019, 196: 1257). However, there is no report on the application of lignite as catalyst support in $CO_2$ methanation. In addition, the ion exchange method takes advantage of the rich oxygen-containing groups on the surface of lignite to realize the loading of active metal. Meanwhile, because of the limited amount of exchangeable ions, the active metal often has a low loading amount in the products prepared by this method.

SUMMARY

In view of the above, an objective of the present disclosure is to provide a method for preparing a lignite char supported nano-cobalt composite catalyst for $CO_2$ methanation, so as to solve the problem of catalyst deactivation caused by the reaction between active metal and oxide support in the common $CO_2$ methanation catalyst and save the preparation cost.

The above objective is achieved by the technical solution of the present disclosure below:

A method for preparing a lignite char supported nano-cobalt composite catalyst, comprising the following steps:

1) crushing and screening original lignite blocks to obtain lignite particles;

2) adding a cobalt precursor and the lignite particles into a solvent and mixing, subjecting the lignite particles to an impregnating, and drying the resulting mixture after the impregnating to obtain a solid substance A; and 3) subjecting the solid substance A to a high-temperature pyrolysis treatment to obtain a lignite char supported nano-cobalt composite catalyst.

In some embodiments, the process of adding a cobalt precursor and the lignite particles into a solvent and mixing, subjecting the lignite particles to an impregnating, and drying the resulting mixture after the impregnating to obtain a solid substance A in step 2) comprises:

adding the lignite particles to a solvent and ultrasonically dispersing, and then adding a cobalt precursor and continuing ultrasonically dispersing to form a mixed solution; stirring the mixed solution at a certain temperature until the solvent is fully volatilized, and drying the remaining substance to obtain a solid substance A.

In some embodiments, the process of stirring the mixed solution at a certain temperature until the solvent is fully volatilized comprises:

stirring the mixed solution at ambient temperature until the solvent is fully volatilized, or stirring the mixed solution in a water bath at 30-60° C. for a period of time, and then continuing stirring the mixed solution at ambient temperature until the solvent is fully volatilized.

In some embodiments, before the process of adding a cobalt precursor and the lignite particles into a solvent and mixing in step 2), the method further comprises: subjecting the lignite particles to an acid treatment.

In some embodiments, the acid treatment comprises:

adding the lignite particles into an acid solution that is selected from the group consisting of a nitric acid solution, a sulfuric acid solution, and a hydrochloric acid solution, and stirring the resulting mixture in a water bath at a temperature ranging from ambient temperature to 55° C. for not less than 2 h.

In some embodiments, the feeding percentage of cobalt in the cobalt precursor to the lignite particles in step 2) is in a range of 5 wt %-15 wt %.

In some embodiments, the cobalt precursor in step 2) is selected from the group consisting of cobalt salt and cobalt salt solution; the cobalt salt is selected from the group consisting of cobalt nitrate, cobalt carbonate and cobalt acetate; the solute of the cobalt salt solution is selected from the group consisting of cobalt nitrate, cobalt carbonate and cobalt acetate, and the solvent of the cobalt salt solution is selected from the group consisting of ethanol, water and a mixture of ethanol and water; the solvent in step 2) is selected from the group consisting of ethanol, water and a mixture of ethanol and water.

In some embodiments, the process of subjecting the solid substance A to a high-temperature pyrolysis treatment to obtain a lignite char supported nano-cobalt composite catalyst in step 3) comprises:

heating the solid substance A to 700-900° C. at a heating rate of 0.5-10° C./min in an inert atmosphere, and holding for 1-6 h to obtain a lignite char supported nano-cobalt composite catalyst.

In some embodiments, the inert atmosphere is selected from the group consisting of argon, nitrogen and a mixed gas of argon and nitrogen.

Another objective of the present disclosure is to provide a lignite char supported nano-cobalt composite catalyst, as prepared by the above methods, wherein the lignite char supported nano-cobalt composite catalyst has a specific surface area of 350 $m^2/g$-470 $m^2/g$ and a loading amount of nano-cobalt of 9 wt %-27 wt %, wherein the nano-cobalt has a size of 1 nm-15 nm.

Compared with the prior art, the method for preparing a lignite char supported nano-cobalt composite catalyst according to the present disclosure has the following advantages:

1. According to the present disclosure, lignite is used as a raw material, and the lignite char is loaded with nano-cobalt by a modified impregnation method followed by a high-temperature pyrolysis process to obtain a lignite char supported nano-cobalt catalyst with a hierarchical pore structure. Applying the catalyst to $CO_2$ methanation can effectively avoid the problem of catalyst deactivation which is commonly caused by the reaction between active metals and oxide supports in the current $CO_2$ methanation catalysts. Moreover, the catalyst has a high specific surface area, and the active metals have a nano-scale size and a good dispersion. Typically, the lignite char supported nano-cobalt catalyst has a specific surface area of 350 $m^2/g$-470 $m^2/g$ and a loading amount of nano-cobalt of 9 wt %-27 wt %, and the nano-cobalt has a size of 1 nm-15 nm. The above advantages make the catalyst have an excellent catalytic activity for $CO_2$ methanation at a low temperature, thus meeting the needs of energy conservation and environmental protection in industrial catalysis, being beneficial to the industrial popularization of $CO_2$ methanation technology, and further alleviating the greenhouse effect.

2. According to the present disclosure, the lignite char supported nano-cobalt catalyst is prepared from lignite with a wide source and a low price, so that the preparation cost of $CO_2$ methanation catalyst is greatly reduced, and the high value-added utilization of lignite is realized; the preparation method is simple and feasible, and is very suitable for industrial popularization and application.

3. According to the present disclosure, a modified impregnation method which is simple to operate, mild and controllable, is adopted, so that the active metal precursor can enter the pore channels of the lignite through capillary action in the impregnation process; meanwhile, nano-size pore channels in the lignite with natural hierarchical pore structure have spatial confinement effect, so that aggregation of active metals can be inhibited. Compared with an ion exchange method, a composite catalyst with a high loading amount of metals can be obtained by the modified impregnation method of the present disclosure, and in the method, the loading amount of cobalt can be controlled by changing the feeding percentage, and therefore the method is suitable for large-scale popularization and application.

BRIEF DESCRIPTION OF THE DRAWINGS

The drawings forming a part of the present disclosure are intended to further assist in understanding the present disclosure, and the illustrative embodiments of the present disclosure and their descriptions are intended to illustrate the present disclosure, and do not make improper limitations to the scope of the present disclosure. In the drawings.

DETAILED DESCRIPTION

It should be noted that the embodiments of the present disclosure and the features in the embodiments can be combined with each other when free from conflict.

The present disclosure will be described in detail with reference to the drawings and examples.

Example 1

A lignite char supported nano-cobalt composite catalyst was specifically prepared by the following process:

1) raw lignite blocks were crushed and screened to obtain lignite particles;

2) 2 g of lignite particles were weighed and dispersed in 100 g of ethanol, and the resulting mixture was ultrasonically dispersed for 5 min; 4.93 g of $Co(NO_3)_2$ solution in ethanol (20 wt %) was added thereto (the feeding percentage of cobalt in the $Co(NO_3)_2$ solution in ethanol to the lignite particles was 10 wt %), and the resulting mixture was ultrasonically dispersed for another 5 min; the mixed solution obtained by the ultrasonic dispersion was transferred to a stirrer and stirred in a water bath at 45° C. for 2 h to volatilize most of ethanol, then the water bath was cooled to ambient temperature, and the stirring was kept until the ethanol was fully volatilized, and the remaining substance was vacuum dried at 45° C. for 10 h to obtain a solid substance A;

3) the solid substance A was subjected to a high-temperature pyrolysis treatment at 700° C. in Ar for 2 h to obtain a lignite char supported nano-cobalt composite catalyst.

The lignite char supported nano-cobalt composite catalyst of this example was subjected to an XRD test. The test result is shown in FIG. 1.

Figure 1:
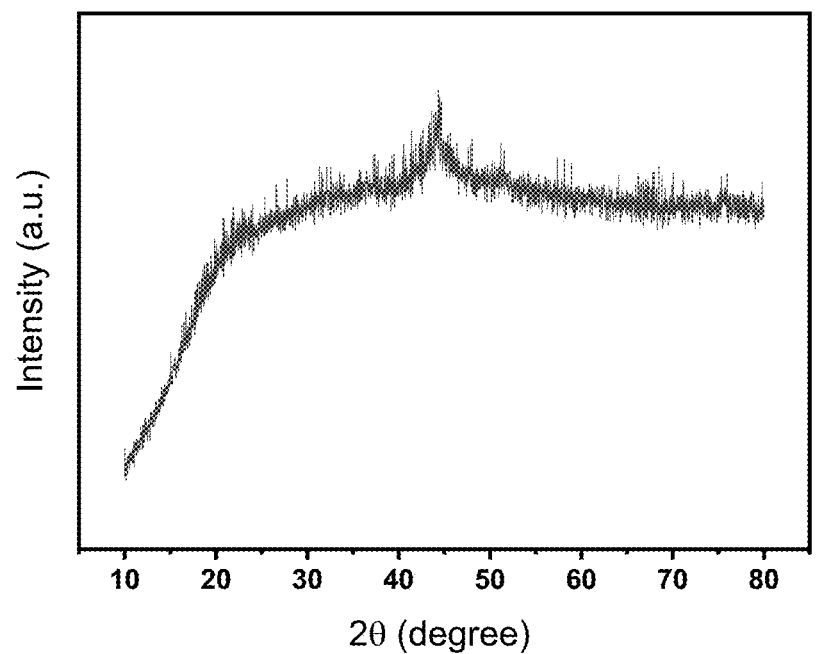
FIG. 1 shows an XRD (Powder X-ray Diffraction) pattern of the lignite char supported nano-cobalt composite catalyst obtained in Example 1 of the present disclosure.

It can be observed from FIG. 1 that the lignite char supported nano-cobalt composite catalyst of this example has a diffraction peak near 2θ=44°, corresponding to the crystal plane of Co (111), and the diffraction peak is weak and widened, indicating that the nano-cobalt particles have a small size.

The lignite char supported nano-cobalt composite catalyst of this example was subjected to a transmission electron microscope test, and the size of the cobalt particles was investigated and statistically analyzed. The test result is shown in FIG. 2.

Figure 2:
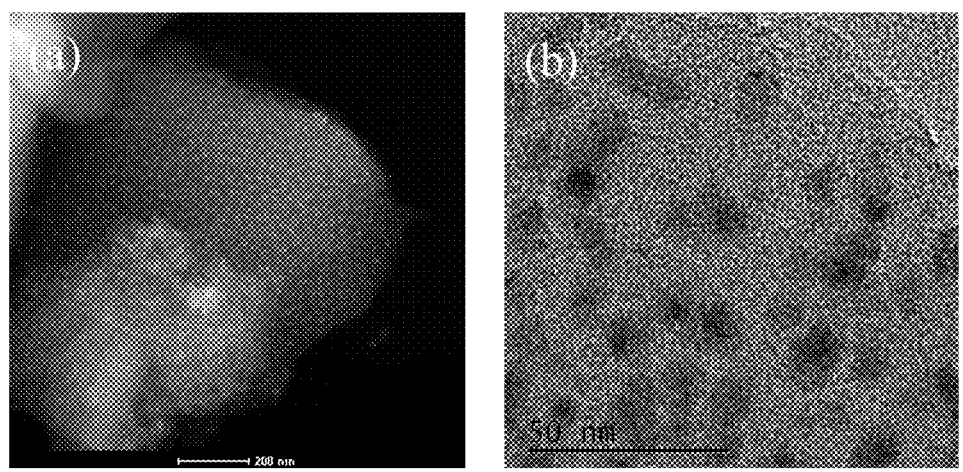
FIG. 2 shows a TEM (Transmission Electron Microscopy) dark-field image (a) and a TEM bright-field image (b) of the lignite char supported nano-cobalt composite catalyst obtained in Example 1 of the present disclosure in the HAADF-STEM mode.

It can be observed from FIG. 2 that in the lignite char supported nano-cobalt composite catalyst of this example, the nano-cobalt particles were uniformly dispersed on the lignite char; the cobalt particles have a size distribution range of 3-15 nm and an average size of 9.3 nm.

The lignite char supported nano-cobalt composite catalyst of this example was subjected to a nitrogen absorption-desorption test. The result is shown in FIG. 3.

Figure 3:
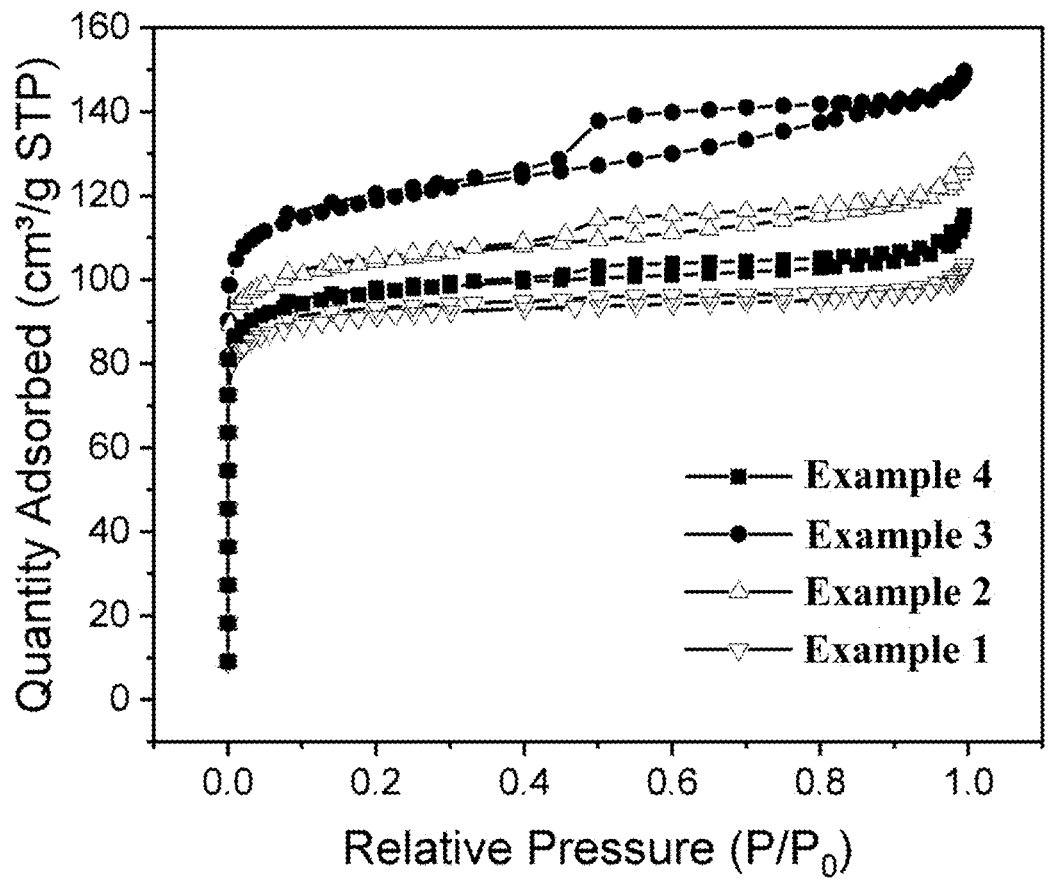
FIG. 3 shows the nitrogen adsorption-desorption isotherm curves of the lignite char supported nano-cobalt composite catalysts obtained in Examples 1-4 of the present disclosure.

It can be observed from FIG. 3 that the nitrogen adsorption-desorption isotherm curve of the lignite char supported nano-cobalt composite catalyst in this example shows that there are nano-scale pores in the sample, and the pore size calculation and analysis show that there are micropores, mesopores and macropores in the sample; the catalyst has a specific surface area of 359 m$^2$/g and a pore volume of 0.158 cm$^3$/g.

Figure 4:
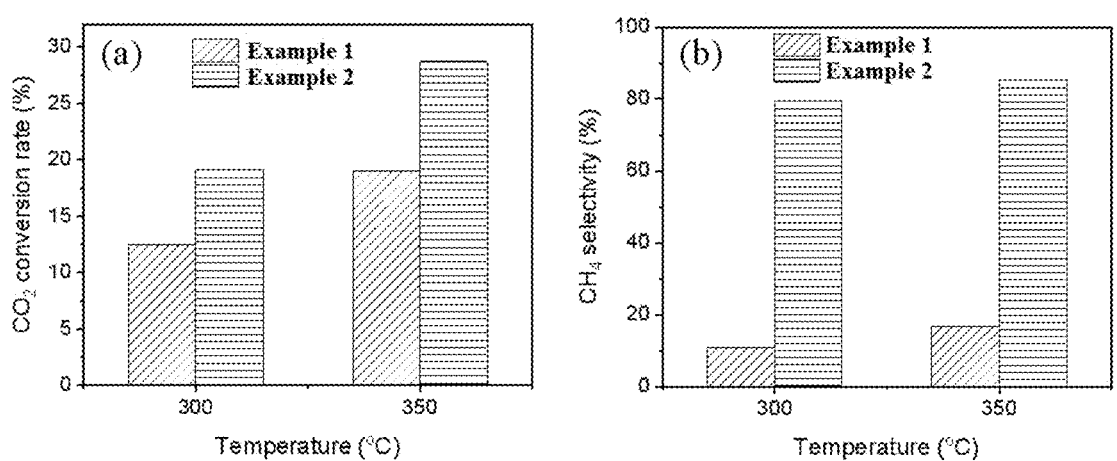
FIG. 4 shows the $CO_2$ conversion rate (a) and $CH_4$ selectivity (b) of the lignite char supported nano-cobalt composite catalysts obtained in Examples 1 and 2 of the present disclosure at different temperatures and atmospheric pressure.

The catalytic activity of the lignite char supported nano-cobalt composite catalyst in this example was evaluated as follows: a $CO_2$ hydrogenation test was carried out on a fixed reaction bed under atmospheric pressure. The $CO_2$ hydrogenation test under atmospheric pressure was carried out in a self-made fixed bed reactor, and the specific process was as follows:

200 mg of the composite catalyst sample was weighed and mixed with quartz sand, and the obtained mixture was added to a reaction tube; 10 wt % $H_2$ was introduced into the reaction tube at a rate of 50 mL/min for pre-reduction at 400° C. for 2 h, and then it was switched to a reaction gas ($H_2$:$CO_2$=4:1) for a $CO_2$ hydrogenation test, wherein during the test, the flow rate of the reaction gas was 25 mL/min; the reaction product was introduced into a gas chromatograph for analysis, and the analysis result was shown in FIG. 4.

It can be observed from FIG. 4 that the lignite char supported nano-cobalt composite catalyst in this example has a $CO_2$ conversion of 19.1% and a $CH_4$ selectivity of 16.7% at 350° C.

Example 2

A lignite char supported nano-cobalt composite catalyst was specifically prepared by the following process:

1) raw lignite blocks were crushed and screened to obtain lignite particles;

2) a certain amount of lignite particles were weighed and added into a 2 mol/L nitric acid solution, the resulting mixture was stirred in a water bath at 50° C. for 2 h to obtain a mixed solution; the mixed solution was filtered, and the obtained solid was washed with deionized water for several times and dried at 120° C. to obtain acid-washed lignite particles;

3) 2 g of the acid-washed lignite particles were weighed and dispersed in 100 g of ethanol, and the resulting mixture was ultrasonically dispersed for 5 min; 4.93 g of $Co(NO_3)_2$ solution in ethanol (20 wt %) was added thereto (the feeding percentage of cobalt in the $Co(NO_3)_2$ solution in ethanol to the lignite particles was 10 wt %) and the resulting mixture was ultrasonically dispersed for another 5 min; the mixed solution obtained by the ultrasonic dispersion was transferred to a stirrer and stirred in a water bath at 45° C. for 2 h to volatilize most of ethanol, then the water bath was cooled to ambient temperature and the stirring was kept until the ethanol was fully volatilized, and the remaining substance was vacuum dried at 45° C. for 10 h to obtain a solid substance A;

4) the solid substance A was subjected to a high-temperature pyrolysis treatment at 700° C. in Ar for 2 h to obtain a lignite char supported nano-cobalt composite catalyst.

The acid-washed lignite particles of this example was analyzed by FT-IR and compared with the lignite particles without the acid washing. The test results are shown in FIG. 5.

Figure 5:
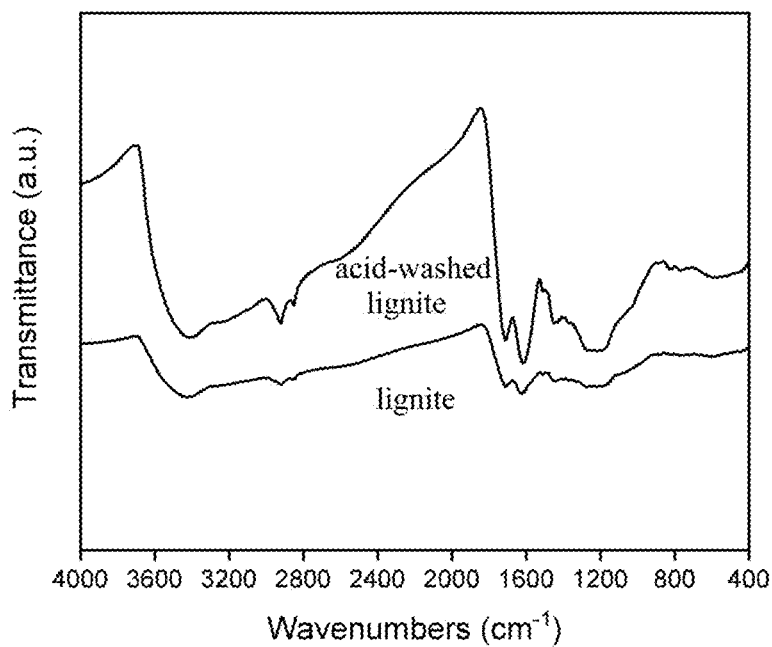
FIG. 5 shows FT-IR spectra of the acid-washed lignite as prepared in Example 2 of the present disclosure and the lignite without the acid washing.

It can be observed from FIG. 5 that the absorption peak at 1710 cm$^{-1}$ is assigned to the stretching vibration of C=O, which indicates that there are oxygen-containing functional groups on the surface of the lignite and the oxygen-containing functional groups on the surface are increased after the acid washing.

The lignite char supported nano-cobalt composite catalyst of this example was subjected to a nitrogen absorption-desorption test. The result is shown in FIG. 3.

It can be observed from FIG. 3 that the nitrogen adsorption-desorption isotherm curve of the lignite char supported nano-cobalt composite catalyst in this example shows that there are nano-scale pores in the sample, and the pore size calculation and analysis show that there are micropores, mesopores and macropores in the sample; the catalyst has a specific surface area of 408 m²/g and a pore volume of 0.196 cm³/g.

The lignite char supported nano-cobalt composite catalyst of this example was subjected to a TEM test, and the size of the cobalt particles was investigated and statistically analyzed. The test result is shown in FIG. 6.

Figure 6:
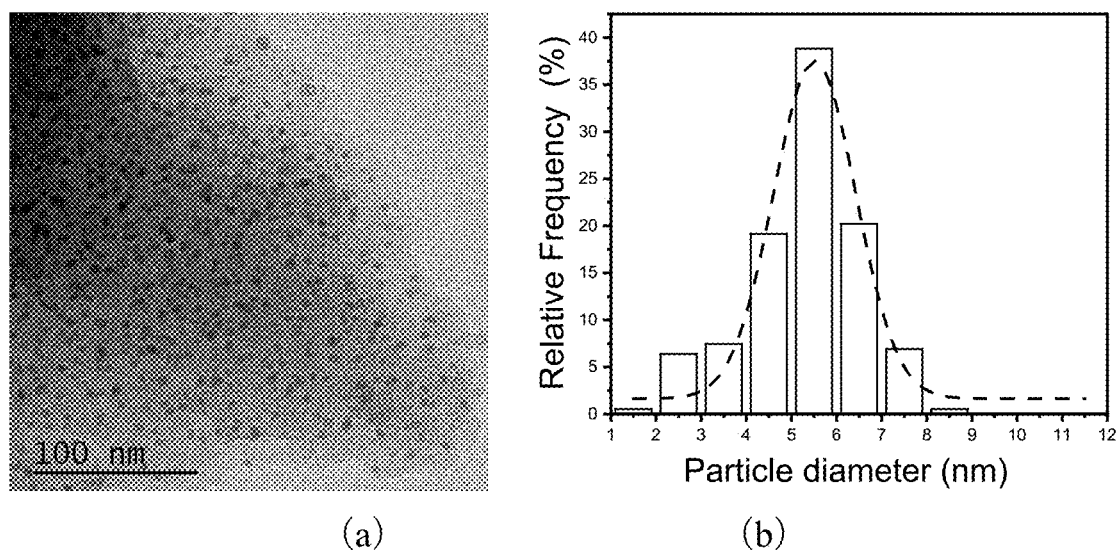
FIG. 6 shows a TEM image (a) and the corresponding cobalt particle size distribution (b) of the lignite char supported nano-cobalt composite catalyst obtained in Example 2 of the present disclosure.

It can be observed from FIG. 6 that the cobalt particles in the lignite char supported nano-cobalt composite catalyst have a size distribution range of 1-9 nm and an average size of 5.5 nm, and the nano-cobalt particles were uniformly dispersed on the lignite char.

The catalytic activity of the lignite char supported nano-cobalt composite catalyst in this example was evaluated as follows: a $CO_2$ hydrogenation test was carried out on a fixed reaction bed under atmospheric pressure. The $CO_2$ hydrogenation test under atmospheric pressure was carried out in a self-made fixed bed reactor, and the specific process was as follows:

200 mg of the composite catalyst sample was weighed and mixed with quartz sand, and the obtained mixture was added to a reaction tube; 10 wt % $H_2$ was introduced into the reaction tube at a rate of 50 mL/min for pre-reduction at 400° C. for 2 h, and then it was switched to a reaction gas ($H_2:CO_2=4:1$) for a $CO_2$ hydrogenation test, wherein during the test, the flow rate of the reaction gas was 25 mL/min; the reaction product was introduced into a gas chromatograph for analysis, and the analysis result is shown in FIG. 4.

It can be observed from FIG. 4 that the lignite char supported nano-cobalt composite catalyst in this Example has a $CO_2$ conversion of 28.7% and a $CH_4$ selectivity of 85.3% at 350° C.

Example 3

This example differed from Example 2 only in that: in the preparation process of this example, the amount of $Co(NO_3)_2$ solution in ethanol (20 wt %) added in step 3) was 2.47 g, corresponding to which the feeding percentage of cobalt in the $Co(NO_3)_2$ solution in ethanol to the acid-washed lignite particles was 5 wt %, and other operations were the same as those in Example 2.

The lignite char supported nano-cobalt composite catalyst of this example was subjected to a TEM test, and the size of the cobalt particle was investigated and statistically analyzed.

It can be known from the test that the cobalt particles in the lignite char supported nano-cobalt composite catalyst of this example have an average size of 5 nm.

The lignite char supported nano-cobalt composite catalyst of this example was subjected to a TG (Thermogravimetry) test in $O_2$.

From the calculation of the test results, it can be known that the loading amount of cobalt in the lignite char supported nano-cobalt composite catalyst of this example (cobalt:lignite char) is 9 wt %.

The lignite char supported nano-cobalt composite catalyst of this example was subjected to a nitrogen absorption-desorption test. The result is shown in FIG. 3.

It can be observed from FIG. 3 that the nitrogen adsorption-desorption isotherm curve of the lignite char supported nano-cobalt composite catalyst in this example shows that there are nano-scale pores in the sample, and the pore size calculation and analysis show that there are micropores, mesopores and macropores in the sample; the catalyst has a specific surface area of 461 m²/g and a pore volume of 0.230 cm³/g.

Example 4

This example differed from Example 2 only in that: in the preparation process of this example, the amount of $Co(NO_3)_2$ solution in ethanol (20 wt %) added in step 3) was 7.41 g, corresponding to which the feeding percentage of cobalt in the $Co(NO_3)_2$ solution in ethanol to the acid-washed lignite particles was 15 wt %, and other operations were the same as those in Example 2.

The lignite char supported nano-cobalt composite catalyst of this example was subjected to a TEM test, and the size of the cobalt particles was investigated and statistically analyzed.

It can be known from the test that the cobalt particles in the lignite char supported nano-cobalt composite catalyst of this example have an average size of 6 nm.

The lignite char supported nano-cobalt composite catalyst of this example was subjected to a TG test in $O_2$.

From the calculation of the test results, it can be known that the loading amount of cobalt in the lignite char supported nano-cobalt composite catalyst of this example (cobalt:lignite char) is 27 wt %.

The lignite char supported nano-cobalt composite catalyst of this example was subjected to a nitrogen absorption-desorption test. The result is shown in FIG. 3.

It can be observed from FIG. 3 that the nitrogen adsorption-desorption isotherm curve of the lignite char supported nano-cobalt composite catalyst in this example shows that there are nano-scale pores in the sample, and the pore size calculation and analysis show that there are micropores, mesopores and macropores in the sample; the catalyst has a specific surface area of 380 m²/g and a pore volume of 0.175 cm³/g.

The above are only preferred embodiments of the present disclosure, and are not used to limit the present disclosure. Any modifications, equivalent substitutions, improvements and the like made within the spirit and principle of the present disclosure should be fall within the protection scope of the present disclosure.

What is claimed is:
1. A method for preparing a lignite char supported nano-cobalt composite catalyst, comprising the following steps:
   1) crushing and screening original lignite blocks to obtain lignite particles;
   2) adding a cobalt precursor and the lignite particles into a solvent and mixing, subjecting the lignite particles to an impregnating, and drying a resulting mixture after impregnating to obtain a solid substance A; and
   3) subjecting the solid substance A to a high-temperature pyrolysis treatment to obtain the lignite char supported nano-cobalt composite catalyst;
   wherein
   adding the cobalt precursor and the lignite particles into a solvent and mixing, subjecting the lignite particles to the impregnating, and drying the resulting mixture after impregnating to obtain the solid substance A in step 2) comprises:
     adding the lignite particles to the solvent and ultrasonically dispersing, and then adding the cobalt precursor and continuing ultrasonically dispersing to form a mixed solution; stirring the mixed solution at a certain temperature until the solvent is fully volatilized, and drying remaining substance to obtain the solid substance A; and subjecting the solid substance A to a high-temperature pyrolysis treatment to obtain the lignite char supported nano-cobalt composite catalyst in step 3) comprises:

heating the solid substance A to 700-900° C. at a heating rate of 0.5-10° C./min in an inert atmosphere, and holding for 1-6 h to obtain the lignite char supported nano-cobalt composite catalyst;

wherein the lignite char supported nano-cobalt composite catalyst has a specific surface area of 350 m$^2$/g-470 m$^2$/g and a loading amount of nano-cobalt of 9 wt %-27 wt %.

2. The method as claimed in claim 1, wherein the process of stirring the mixed solution at a certain temperature until the solvent is fully volatilized comprises:

stirring the mixed solution at ambient temperature until the solvent is fully volatilized, or stirring the mixed solution in a water bath at 30-60° C. for a period of time, and then continuing stirring the mixed solution at ambient temperature until the solvent is fully volatilized.

3. The method as claimed in claim 2, wherein before the process of adding a cobalt precursor and the lignite particles into a solvent and mixing in step 2), the method further comprises: subjecting the lignite particles to an acid treatment.

4. The method as claimed in claim 3, wherein the acid treatment comprises:

adding the lignite particles into an acid solution that is selected from the group consisting of a nitric acid solution, a sulfuric acid solution and a hydrochloric acid solution, and stirring the resulting mixture in a water bath at a temperature ranging from ambient temperature to 55° C. for not less than 2 h.

5. The method as claimed in claim 1, wherein before the process of adding a cobalt precursor and the lignite particles into a solvent and mixing in step 2), the method further comprises: subjecting the lignite particles to an acid treatment.

6. The method as claimed in claim 5, wherein the acid treatment comprises:

adding the lignite particles into an acid solution that is selected from the group consisting of a nitric acid solution, a sulfuric acid solution and a hydrochloric acid solution, and stirring the resulting mixture in a water bath at a temperature ranging from ambient temperature to 55° C. for not less than 2 h.

7. The method as claimed in claim 1, wherein a feeding percentage of cobalt in the cobalt precursor to the lignite particles in step 2) is in a range of 5 wt % to 15 wt %.

8. The method as claimed in claim 1, wherein in step 2), the cobalt precursor is selected from the group consisting of a cobalt salt and a cobalt salt solution, wherein the cobalt salt is selected from the group consisting of cobalt nitrate, cobalt carbonate and cobalt acetate, the solute of the cobalt salt solution is selected from the group consisting of cobalt nitrate, cobalt carbonate and cobalt acetate, and the solvent of the cobalt salt solution is selected from the group consisting of ethanol, water and a mixture of ethanol and water; and the solvent is selected from the group consisting of ethanol, water and a mixture of ethanol and water.

9. The method as claimed in claim 1, wherein the inert atmosphere is selected from the group consisting of argon, nitrogen and a mixed gas of argon and nitrogen.

* * * * *